United States Patent Office 3,585,056
Patented June 15, 1971

3,585,056
SINTERED CERAMIC BODIES OF ALUMINA-NEPHELINE SYENITE COMPOSITIONS
Edward A. Bush, Painted Post, N.Y., assignor to Corning Glass Works, Corning, N.Y.
No Drawing. Filed June 19, 1967, Ser. No. 647,211
Int. Cl. C04b 33/00
U.S. Cl. 106—45                                 5 Claims

ABSTRACT OF THE DISCLOSURE

Sintered ceramic bodies, particularly tableware items, are made from alumina-nepheline syenite compositions. Alumina and nepheline syenite together form at least 88% of compositions, balance being clay and/or mineralizers. Alumina constitutes from 50 to 70% of total of alumina and nepheline syenite. Compositions are plastified with fugitive organic vehicle and formed into green bodies by transfer or injection molding. The vehicle is volatilized before firing. Fired bodies are impervious, have high modulus of rupture.

BACKGROUND OF THE INVENTION

This invention relates to sintered, shaped ceramic articles of alumina-nepheline syenite compositions. In particular, it relates to such articles which are particularly suitable for use as dinnerware.

Ordinary ceramic whiteware or dinnerware may generally be considered to be composed of certain clays, silica and feldspar, together with small amounts of secondary fluxes. However, other materials, such as bone ash, pyrophyllite and alumina may also be included. In any formulation, however, the clay content is high, constituting from at least 25 to about 40% by weight of the formulation A principal function of the clay is to lend plasticity to the wet composition containing it so that ceramic bodies of desired shape can readily be formed therefrom by conventional techniques such as jiggering.

In the relatively recent past, consumer interest, to a considerable degree, has shifted from ordinary dinnerware or china to glass-ceramic tableware. As pointed out in U.S. Pat. No. 3,201,266, such tableware may possess the look and feel of fine china. Additionally, it is extremely resistant to staining by foods and displays excellent durability to detergent action. Moreover, from the utilitarian viewpoint, the glass-ceramic product is definitely superior to china dinnerware. The mechanical strength and resistance to thermal shock of a glass-ceramic (semicrystalline ceramic) body is much greater than that of china. Furthermore, it is much less porous and much more resistant to abrasion than are most chinas.

As stated in U.S. Pat. No. 3,201,266, the manufacture of glass-ceramic articles or semicrystalline ceramic bodies, as they are otherwise frequently referred to, involving the controlled crystallization of a glass in situ by means of a special heat treating process, is a relatively recent development in the glass art. U.S. Pat. No. 2,920,971 sets forth, in detail, the mechanisms and theoretical considerations comprehended in the production of glass-ceramic bodies. However, in general terms, the process normally consists of adding a nucleating or crystallization-promoting agent to a glass-forming batch, melting the batch, simultaneously cooling and shaping the melt into a glass body, and thereafter heat treating the glass shape pursuant to a specific time-temperature schedule. The special heat treatment results in the glass shape being converted into a body composed of fine-grained crystals randomly oriented and substantially uniformly dispersed throughout a glassy matrix, the crystals comprising the major portion of the mass of the body. The semicrystalline constitution of the body causes its physical properties to be vitally different from those of the original glass. Of extreme interest and importance is the fact that the crystallization of the glass in situ permits the manufacture of substantially homogeneous bodies of fine-grained crystals which are essentially free of voids and are non-porous. Still further, as the material is first a glass, the articles can be fashioned into almost any configuration using the conventional methods of shaping heat-softened glass such as blowing, casting, drawing, pressing, or spinning.

It will be evident from the above language of U.S. Pat. No. 3,201,266, that the costs of production of glass-ceramics are greater than are those for the production of most chinas or pottery. In general, however, the advantages heavily outweigh the factor of cost.

However, for certain tableware items, the cost factor may be such that the statement immediately above is not necessarily true. These are the so-called accessory items, such as salt and pepper shakers, creamers, sugar bowls and the like. Because of their relatively complex shape they are not as easily formed as, for example, a dinner plate or a soup bowl. Accordingly, their manufacture is necessarily more costly than that of the more easily formed items. Furthermore, the rate of production of these accessory items is obviously low in comparison to the rate of production of plates and the like. Thus, the investment in equipment for their production is relatively higher than that required for the items produced in greater quantity.

Finally, these accessory items are far less frequently subjected to handling, with the possibility of breakage, and to detergent action than are dinner plates and the like. Hence, the period of their probable usefulness is predictably longer. Accordingly, and as a practical matter, they need not necessarily be of the quality of the major glass-ceramic dinnerware items, although obviously it is desirable that they exhibit to a considerable extent the superiority of glass ceramics relative to ordinary china.

SUMMARY OF THE INVENTION

It is the principal object of the present invention to provide compositions for the production of such dinnerware items.

The major raw material components employed in the compositions of the present invention are calcined alumina and ceramic whiteware grade of nepheline syenite. The latter material, which is composed of nephelite, potash feldspar and soda feldspar, typically corresponds to the following analysis by weight: 60.7% $SiO_2$, 23.3% $Al_2O_3$, 0.07% $Fe_2O_3$, 0.7% CaO, 0.1% MgO, 9.8% $Na_2O$, 4.6% $K_2O$ and 0.7% of material lost on ignition. Nepheline syenite exhibits excellent fluxing characteristics which permits the avoidance of unduly elevated firing temperature and minimizes the need for secondary fluxes. Furthermore, with this material a wide firing range is attained.

These major components, alumina and nepheline syenite, together constitute from about 88 to 100% of the present compositions. Kaolinitic or china clays, which are of aid in densifying the sintered body and in minimizing sagging during firing, may be employed in an amount of from 0 to about 10%. This amount of clay is not, of course, sufficient to lend to the present compositions the wet plashticity necessary for the forming of green bodies by the usual methods of forming tableware, such as jiggering or compression molding.

In addition to the small amount of clay, the compositions of the present invention may advantageously contain minor amounts, from 0 to 2% by weight, of auxiliary fluxes or mineralizers such as magnesium oxide, talc, dolomite, titania, ferric oxide and the like. These materials are effective to lower the temperature at which a body of the composition should be fired for maturing, or to shorten the time at which the body must be maintained at the maturing temperature. In either case, these auxiliary fluxes, since theey speed the maturation process, may be of aid in preventing sagging of bodies of the compositions described during firing. In effect, these materials enhance the desirable fluxing characteristics of the nepheline syenite component of the compositions. Their incorporation in the compositions of the inventions allows a latitude in the choice of the maturing range of time and temperature that permits the development of optimum properties in the fired bodies while minimizing the likelihood of overfiring.

The choice of mineralizer to be employed, and the amount, is a matter within the skill of the worker in the art. However, it may be noted that consideration of the final color of the body to be produced will have a bearing on this choice. Certain mineralizers, such as ferric oxide, will impart a definite color to the fired body. This fact must be taken into account both when a white fired body is desired and when stains or colorants are added to the compositions, in known manner, to produce colored fired bodies.

As above indicated, the total of alumina and nepheline syenite, the major components, will constitute from about 88 to 100% by weight of the compositions contemplated. Within this total, alumina represents from about 50 to 70%, nepheline syenite representing the balance, or from about 30 to about 50%. Accordingly, in view of the possibility of clay and secondary fluxes being present, the compositions to be employed in forming the products of the present invention will contain from about 44 to about 70% of alumina, from about 26.4 to about 50% of nepheline syenite, from about 0 to about 10% of clay as above defined and from about 0 to about 2% of secondary fluxes or mineralizers.

While the compositions employed for the production of dinnerware items of the present invention may contain a limited amount of clay, the amount is insufficient to impart to the compositions the characteristics needed for forming by either jiggering or pressing. However, the compositions are well adapted for use, for example, in the method of molding ceramic articles described in copending applications, Ser. Nos. 391,062 and 428,114, now U.S. Pats. 3,330,892 and 3,346,680, respectively. Briefly, the method of the said applications involves preparing a molding mixture of a comminuted ceramic composition, a solid organic vehicle material having a high solid state vapor pressure and an organic deflocculant to maintain the ceramic particles well dispersed and suspended in the vehicle when it is melted. Typical organic vehicles include paradichlorobenzene, naphthalene and camphor. In preparing the molding mixture, the vehicle is melted, the other materials are added thereto with mixing adequate to uniformly disperse the ceramic material in the vehicle. The mixture is cooled to solidify the organic vehicle and the resulting rigidified mixture is ground to particles of a size which permits easy feeding into an injection molding apparatus. Alternatively, the molten material may be placed directly in the feed chamber of a transfer molding press.

The ground particles are fed into the charging cylinder of a conventional injection molding apparatus for ceramic molding, heated to render it fluid, i.e. above the melting point of the vehicle, and then injected into a mold having a cavity of the desired configuration. The injected charge is allowed to cool and solidify in the mold. The shaped, bonded article is then removed from the mold and is heated at a temperature lower than the melting point of any component of the molding mixture for a period of time necessary for the escape, by sublimation, of substantially all of the organic vehicles. Finally, the article is fired to sinter the ceramic particles together.

Application Ser. No. 391,062, filed July 24, 1964, employs as a deflocculant in the above described method an organic substance which may be (a) a surfactant which is substantially soluble in the vehicle and is substantially free of water, (b) aliphatic monocarboxylic acids having at least three carbon atoms, (c) salts of such acids, (d) amides of such acids and (e) esters of such acids, the alcohol radical of which also contains at least three carbon atoms. The application additionally teaches the desirability of including a small amount of an organic binder in the molding mixture to lend strength to the green ceramic body after the organic vehicle has sublimed therefrom.

Monohydric primary alcohols containing at least eight carbon atoms can also be employed as deflocculants, as is disclosed in application Ser. No. 428,114, filed Jan. 26, 1965.

The deflocculant is included in the ceramic molding composition to reduce the viscosity of the fluidized batch. This allows for maximizing the amount of comminuted ceramic material in the batch to a point at which, absent the deflocculant, the mixture would be of an unmoldable consistency. Because of the presence of the deflocculant in the batch mixture, enough comminuted ceramic material can be incorporated into the moldable batch mixture to constitute the major (by weight) component thereof, and the amount of other components that are subsequently removed can be kept down thereby yielding a minimum amount of porosity in the green state and a minimum amount of firing shrinkage. This provides sintered bodies of relatively low porosity and of final dimensions closely conforming to the green state dimensions thereby minimizing finishing operations.

While the compositions of the present invention, as earlier stated, cannot be formed by jiggering, they can be slip cast. Furthermore, green bodies can be formed therefrom by dry pressing. However, the speed and convenience of either injection or transfer molding dictates preference for the employment of these techniques of fabricating tableware from the new ceramic compositions and especially with molding mixture formulations according to the above noted copending applications.

Desirably, the compositions will exhibit a particle size distribution such that all of the particles have a diameter of less than about 40 microns; the average particle size will be within the range of from 3 to 6 microns. In effecting the particle size reduction of the raw materials, as by ball milling, it is preferred that the raw materials be mixed and ball milled together in order that maximum homogeneity of composition be obtained.

Green bodies of the compositions of the present invention may be fired at from about 1100° C. to about 1500° C. being held at that temperature for about two hours. The actual firing temperature is largely determined by the relative amounts of alumina and nepheline syenite: the greater the alumina content, the higher the firing temperature. Preferably, a firing temperature of about 1200° C. will be employed, it having been determined that firing at this temperature is effective to produce fired bodies of good density with little danger of undue distortion taking place. The rate of heating to the maximum firing temperature is not critical and will readily be determined for various compositions by those skilled in the ceramic art.

Within the limits stated, compositions containing the maximum amount of alumina are preferred. Fired bodies of these compositions consist of crystals of alpha-alumina in a glassy matrix, the latter constituting the continuous phase. If the alumina content of the compositions exceeds the stated maximum, the continuity of the glassy matrix is disturbed and the strength of the fired body is seriously impaired. On the other hand, if the alumina content is significantly below the stated maximum, the bonding efficiency of the glassy matrix appears to be less than at the higher level of alumina and the fired body does not possess adequate strength. Nevertheless, satisfactory fired bodies may be obtained from all compositions in which alumina constitutes at least 50% by weight of the total of alumina and nepheline syenite.

DESCRIPTION OF THE PREFERRED EMBODIMENTS

The invention is further defined and illustrated in the following example in which all parts and percentages are on a weight basis unless otherwise noted.

An intimate mixture of powdered calcined alumina, 67.7%, and powdered nepheline syenite, 33.3%, was ball milled for 20 hours in the presence of 0.5%, based on the total of alumina and nepheline syenite, of zinc stearate as a grinding aid. Particle size measurement on the ball milled material indicated that all of the particles had a diameter of less than 40 microns and 70% had a diameter of less than 10 microns. The average particle size was in the range of from 3 to 6 microns. Five thousand grams of this powdered mixture were added with efficient stirring to 800 grams of molten paradichlorobenzene vehicle containing 75 grams of zinc stearate as a deflocculant and 25 grams of a polyethylene glycol (Carbowax 20M) as a binder. A uniform dispersion of the alumina-nepheline syenite in the vehicle was obtained. This dispersion was cooled to solidify the vehicle and the resulting mass was ground to a size suitable for feed in a transfer molding apparatus, that is, to granules about ¼ inch in diameter. The ground material was kept in a closed container until used to prevent loss of paradichlorobenzene through sublimation.

Test samples, in the form of rods 3½ inches in length and 0.377 inch in diameter, were formed from the described granular material in a transfer press at a pressure of about 5000 p.s.i. These samples were placed in an oven fitted with an exhaust fan where they were kept at about 40° C. for 48 hours to effect substantially complete removal of the paradichlorobenzene from the green body. These green test rods were fired according to the following schedule: (1) heated at 400° C./hour to 600° C. (2) heated at 300° C./hour to desired firing temperature, (3) held for 2 hours at firing temperature and (4) cooled at furnace rate.

In the same manner five additional fired test samples were prepared in which the ratio of alumina to nepheline syenite was varied from the above value of 2 to 1.

The modulus of rupture (in flexure) of the samples was determined. The results are set out in Table 1. The firing temperatures indicated are the maximum for each composition according to the above firing schedule. The employment of a temperature much in excess of that given results in overfiring.

TABLE 1

| Sample | $Al_2O_3$ (wt. percent)[1] | Firing temp. (° C.) | MOR $\times 10^3$ (p.s.i.) |
|---|---|---|---|
| 1 | 40 | 1,100 | 9.6 |
| 2 | 50 | 1,150 | 19.4 |
| 3 | 60 | 1,250 | 25.7 |
| 4 | 67.7 | 1,250 | 27.4 |
| 5 | 70 | 1,450 | 27.6 |
| 6 | 80 | 1,450 | 15.4 |

[1] Balance is nepheline syenite.

As will be seen from an inspection of the above data, the composition containing 50 percent each of alumina and nepheline syenite yields practically strong fired bodies. The strength of the fired bodies increases with increasing alumina content until, at about 70 percent alumina content, maximum strength is displayed. Incorporation of additional alumina leads to marked loss of strength; the modulus of rupture of the 80 percent alumina material is little more than half of that of the 70 percent material.

It is to be noted that compositions ordinarily employed in the manufacture of china tableware or whiteware characteristically have a bisque fired MOR in the range of from about $6 \times 10^{-3}$ p.s.i. to about $9 \times 10^{-3}$ p.s.i.

In the firing of hollow green bodies such as cups, bowls and the like it is important that the desired densification to be obtained at as low a temperature as is feasible so that sagging or other distortion of the ware is minimized. The inclusion of a small amount of clay in compositions of the present invention was found effective to accomplish this. The clay may constitute up to about 10 percent of the composition, although about 5 percent of clay is generally effective to give maximum densification at a given firing temperature.

In the manner above described, test pieces were prepared by firing, at various temperatures, green test rods containing 0, 2.5, 5 and 10 percent of kaolin respectively, the balance of the composition being alumina-nepheline syenite, the alumina constituting 66.7 percent of this balance. Density determinations were made for the fired products. The results are summarized in Table 2.

TABLE 2

| Percent clay | Firing temp. (° C.) | Density (g./cc.) |
|---|---|---|
| 2.5 | 1,175 | 2.78 |
| 5.0 | 1,175 | 2.80 |
| 10.0 | 1,175 | 2.76 |
| 0 | 1,200 | 2.73 |
| 2.5 | 1,200 | 2.86 |
| 5.0 | 1,200 | 2.89 |
| 10.0 | 1,200 | 2.84 |
| 0 | 1,225 | 2.89 |
| 2.5 | 1,225 | ca. 3.00 |
| 5.0 | 1,225 | ca. 3.00 |
| 10.0 | 1,225 | ca. 2.97 |

The data in Table 2 generally indicate the desirability of incorporating a minor amount of a clay in the present compositions and, more specifically, that a value in the range of about 2.5 to about 5 percent approaches the optimum value of clay content.

The above procedure was duplicated with exception that during firing the test pieces were supported on two triangular prisms, the supporting edges of which were 2.25 inches apart. All samples sagged to some extent so that bowed or arc-shaped fired pieces were obtained. The extent of sagging of these pieces was measured by measuring the distance from the concave face of the arc-shaped body to the mid-point of the chord joining the points on that face which were opposite the points of support during firing. The distance measured was perpendicular to the chord.

It was determined that for samples of a given density greater than about 2.82, those containing clay sagged to a noticeably smaller degree than did the clay-free material and that about 5 percent of clay appeared to be the most effective amount in minimizing sagging. For example, at a fired density of 2.89, sag values of 0.027, 0.023, 0.015 and 0.026 inch were noted for samples having a clay content of 0, 2.5, 5.0 and 10 percent respectively.

The compositions of the present invention may also, as previously indicated, advantageously contain a small amount, up to about 2 percent, of additives, other than clay, which are effective in causing the development of desired properties, such as maximum density and high modulus of rupture, at lower firing temperatures than those required for compositions lacking such additives. Magnesia is a particularly effective material in this regard. As little as 1 percent of magnesia in a composition otherwise containing only alumina and nepheline syenite in the weight ratio of 2 to 1 permits the development of MOR of $21.3 \times 10^{-3}$ p.s.i. in the fired body at a firing temperature of 1200° C.; a firing temperature of about 1285° C. is required for a body of a similar composition but containing no magnesia. Furthermore, the composition containing 1 percent of magnesia becomes substantially impervious to water when fired at 1200° C. When the magnesia is omitted, a firing temperature of at least 1250° C. is required to impart equivalent imperviousness to the fired body. Similar but less pronounced enhancement of desired properties in the fired body are obtained when calcium oxide, rutile, dolomite and the like are incorporated in the composition. These additives may, of course, be employed in either clay-modified compositions or those containing no clay.

It will be understood that the raw materials used in forming the compositions of the invention should be substantially free of impurities, such as iron that may cause the development of undesired color in the fired bodies. If this condition is met, fired uncolored bodies are brilliantly white. Accordingly, when stains are incorporated into the compositions, the achievement of desired color in the fired body is readily and reproducably accomplished.

Bisque fired tableware articles of the compositions described are generally of significantly higher strength than comparable bisque-fired articles of china compositions. Finished glazed tableware articles of these compositions exhibit greater resistance to breakage and chipping than do representative commercial chinaware articles. Furthermore, because of the imperviousness of the bisque body, crazing of the glaze does not result in staining or discoloration of the product in service.

Even in the absence of a glaze the fired products of the invention are substantially impervious; a stain produced by permitting a penetrant dye solution to dry on the surface thereof can readily be removed by wiping with a damp cloth or by rinsing.

The fired products display a macroscopic homogeneity of structure. Microscopically, the structure is that of fine alpha-alumina particles uniformly dispersed in a nepheline syenite glass continuous phase; the pores, which are closed, are generally uniform in size and are uniformly distributed.

I claim:
1. A sintered ceramic body particularly suitable for use as tableware
   (a) consisting of, by weight, a mixture of about 88 to 100% total of alumina and nepheline syenite, about 0 to 10% of kaolinitic clay and 0 to about 2% of mineralizer, alumina constituting about 50 to 70% of said total of alumina and nepheline syenite, said mixture being substantially iron free, and
   (b) microscopically consisting essentially of finely divided crystals of alpha-alumina uniformly dispersed in a continuous glassy matrix phase formed mainly of said nepheline syenite.

2. A sintered ceramic body according to claim 1 wherein said total of alumina and nepheline syenite is 100% of said mixture and said body microscopically consists solely of said alpha-alumina crystals in said matrix phase.

3. A sintered ceramic body according to claim 1 wherein the content of kaolinitic clay is about 2.5 to 5% of said mixture and said body microscopically consists solely of said alpha-alumina crystals in said matrix phase.

4. A sintered ceramic body according to claim 1 wherein alumina constitutes about two-thirds of the said total of alumina and nepheline syenite.

5. A sintered ceramic body according to claim 2 wherein alumina constitutes about two-thirds of the said total of alumina and nepheline syenite.

References Cited

UNITED STATES PATENTS

| 2,154,069 | 4/1939 | Fessler et al. | 106—46 |
| 2,741,008 | 4/1956 | Snoddy | 106—45X |
| 3,313,609 | 4/1967 | Megles | 106—39X |
| 2,419,290 | 4/1947 | Schaefer | 106—46 |
| 2,887,394 | 5/1959 | Bickford et al. | 106—46 |
| 2,898,217 | 8/1959 | Selsing | 106—46 |
| 3,019,116 | 1/1962 | Doucette | 106—46 |
| 3,330,892 | 7/1967 | Herrmann | 264—328X |

OTHER REFERENCES

Kingery, W. D.: Ceramic Fabrication Processes; New York, 1958, pp. 107–8.

Kingery, W. D.: Introduction to Ceramics; New York, 1960, p. 728.

Kirk-Othmer: Glass, in Encyclopedia of Chemical Technology, 10, 1966, pp. 533–4.

Ceramic Materials, in Ceramic Industry Magazine, vol. 86; Bristol, Conn. (Cahners Publ., January 1966, pp. 66, 67, 128, 131.

HELEN M. McCARTHY, Primary Examiner

W. R. SATTERFIELD, Assistant Examiner

U.S. Cl. X.R.

106—46; 264—59